US006976727B2

(12) United States Patent
Omori

(10) Patent No.: US 6,976,727 B2
(45) Date of Patent: Dec. 20, 2005

(54) SUPPORTING STRUCTURE OF A WINDOW GLASS OF A VEHICLE

(75) Inventor: Toshihisa Omori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/691,678

(22) Filed: Oct. 23, 2003

(65) Prior Publication Data

US 2004/0084931 A1 May 6, 2004

(30) Foreign Application Priority Data

Oct. 31, 2002 (JP) ....................................... 2002-318224

(51) Int. Cl.[7] ................................................... B60J 1/17
(52) U.S. Cl. ..................................... 296/146.16; 49/360
(58) Field of Search ....................... 296/146.16, 216.04, 296/216.08; 49/227, 360, 374, 428, 440

(56) References Cited

U.S. PATENT DOCUMENTS 4,503,639 A 3/1985 Rossie et al.
4,903,436 A 2/1990 Rouillard
4,964,238 A 10/1990 Nishijima et al.
5,979,932 A * 11/1999 Jourdaine et al. ...... 296/146.16
6,364,397 B1 * 4/2002 Bordeaux et al. ........ 296/146.2

FOREIGN PATENT DOCUMENTS

DE 42 03 364 A 8/1993
EP 0 255 811 A 2/1988
EP 0 865 953 A 9/1998
FR 2 681 819 A 4/1993
FR 2 739 060 A 3/1997

* cited by examiner

*Primary Examiner*—Lori L. Coletta
(74) *Attorney, Agent, or Firm*—Carrier, Blackman & Associates, P.C.; William D. Blackman; Joseph P. Carrier

(57) ABSTRACT

A supporting structure of a window glass of a vehicle includes a window runner, which has a junction and an engagement part. The window runner is fixed to the vehicle's cabin side surface of the window glass through the junction, and is engage with a guide rail provided at the vehicle's cabin side through the engagement part.

17 Claims, 4 Drawing Sheets

PRIOR ART

SUPPORTING STRUCTURE OF A WINDOW GLASS OF A VEHICLE

BACKGROUND OF THE INVENTION

1. Field of the Invention

The present invention relates to a supporting structure of a window glass of a vehicle. Preferably, the present invention relates to a supporting structure of a window glass of a vehicle that utilizes window runners, which are fixed to the window glass and engage with a guide rail so that the sliding movement of the window glass along a guide rail is allowed.

2. Description of Relevant Art

Conventionally, various types of operation methods of a window glass of a vehicle that enables the window glass to move smoothly in the open-and-shut directions of a window of a vehicle, has been known. As an example of these types of operation methods, the method, in which the rise-and-lower of the window glass of a vehicle is performed by utilizing a channel so that the window glass moves along the channel, can be cited.

In this method, a window track, which is a U-like shaped member in sectional viewing, is used as the channel. This window track is equipped with a glass run channel made of rubber. Thus, the window glass slides along the glass run channel when the rise-and-lower of the window glass is performed.

In the conventional channel adopting the glass run channel made of rubber, the sliding movement of the window glass may be disturbed due to a deformation of a rubber, a friction between the window glass and the glass run channel, or a manufacturing error.

In the conventional channel adopting the glass run channel made of rubber, additionally, since the provision of the glass run channel is clearly visible from an outside of a vehicle, the appearance (design) of the vehicle may be spoiled. Furthermore, since a rubber is relatively expensive, the adoption of a rubber as a glass run channel may require excess manufacturing cost.

Under these kinds of environments, the apparatus disclosed in Japanese unexamined patent publication S58-16421 has been discovered. In this apparatus, the sliding movement of the window glass is performed while moving a joint, which is screwed to a window glass, in the channel.

FIG. 6 is an enlarged view showing the condition that the joint 101 is fixed to the window glass 100 by screw 102.

As shown in FIG. 6, the joint 101 is provided on the vehicle's cabin side surface 103 of the window glass 100. This joint 101 and the window glass 100 are firmly connected by the screw 102, which is screwed to the window glass 100 from the outside surface 104. Here, a head 105 of the screw 102 is exposed to the outside surface 104 and protrudes from the outside surface 104 of the window glass 100.

In the conventional apparatus disclosed in Japanese unexamined patent publication S58-16421, since the head 105 of the screw 102 is exposed on the outside surface 104 of the window glass 100, a wind-roar due to the head 105 of the screw 102 has arisen. In other words, since air flow (shown by arrow A) is disturbed by the head 105 of the screw 102 and turbulence is caused, this causes a wind-roar and noise.

In the conventional apparatus, additionally, the head 105 of the screw 102 is visible from an outside of the vehicle. Thus, the appearance of a vehicle becomes unattractive.

Therefore, there has been desired a supporting structure of a window glass of a vehicle, that does not cause a wind-roar, and that improves the appearance of the vehicle by making the outside surface of the window glass flush with the vehicle body.

SUMMARY OF THE INVENTION

The present invention relates to a supporting structure of a window glass of a vehicle. This supporting structure includes a window runner and a guide rail. The window runner has a junction and an engagement part. The window runner is fixed to the window glass from the vehicle's cabin side through the junction, and is engaged with the guide rail provided on the vehicle through the engagement part. Thus, the window runner moves along the guide rail, when the window glass adopting this supporting structure is transferred in order to shut or open the window of the vehicle.

According to the present invention, since the window runner is provided at the vehicle's cabin side surface of the window glass and the outside surface of the window glass is flush with the outside surface of the vehicle, the wind-roar due to the protrusion is never caused. Additionally, since the window runner is not exposed to a wind and rain, the considerable endurance of the window runner can be obtained.

In this supporting structure of a window glass of a vehicle, it is preferable that an area (length) in the ups-and-downs directions of the junction is larger than an area (length) in the fore-and-rear directions of the junction. In this case, since the area in the ups-and-downs directions of the junction is large, the adhesive force between the junction and the window glass exceeds the momentum force, which is applied in the ups-and-downs directions with respect to the window glass when the window glass is transferred. Thereby, the window runner is not detached from the window glass, and the smooth slide of the window glass can be obtained.

In this supporting structure of a window glass of a vehicle, the junction of the window runner is sandwiched between the first window piece and the second window piece, when the window glass is composed of a first window piece, which is placed in an external side of the vehicle, and a second window piece, which is placed in a vehicle's cabin side.

In this case, since the junction is sandwiched between the first window piece and the second window piece, the outside surface of the window glass is flush with the outside surface of the vehicle. Thus, the wind-roar due to the protrusion is never caused and the appearance (design) of the vehicle is never spoiled.

DETAILED DESCRIPTION OF THE PREFERRED EMBODIMENTS

The preferred embodiments of the present invention will be explained with reference to the attached drawings.

In the following explanation, the term "fore" means that it is a front side direction with respect to a vehicle, and the term "rear" means that it is a rear side direction with respect to the vehicle.

First Embodiment

Firstly, a supporting structure of a window glass according to the first embodiment of the present invention will be explained. In the present embodiment, specifically, the supporting structure of a window glass, which is provided on a front door of a vehicle, will be explained as an example.

Figure 1:
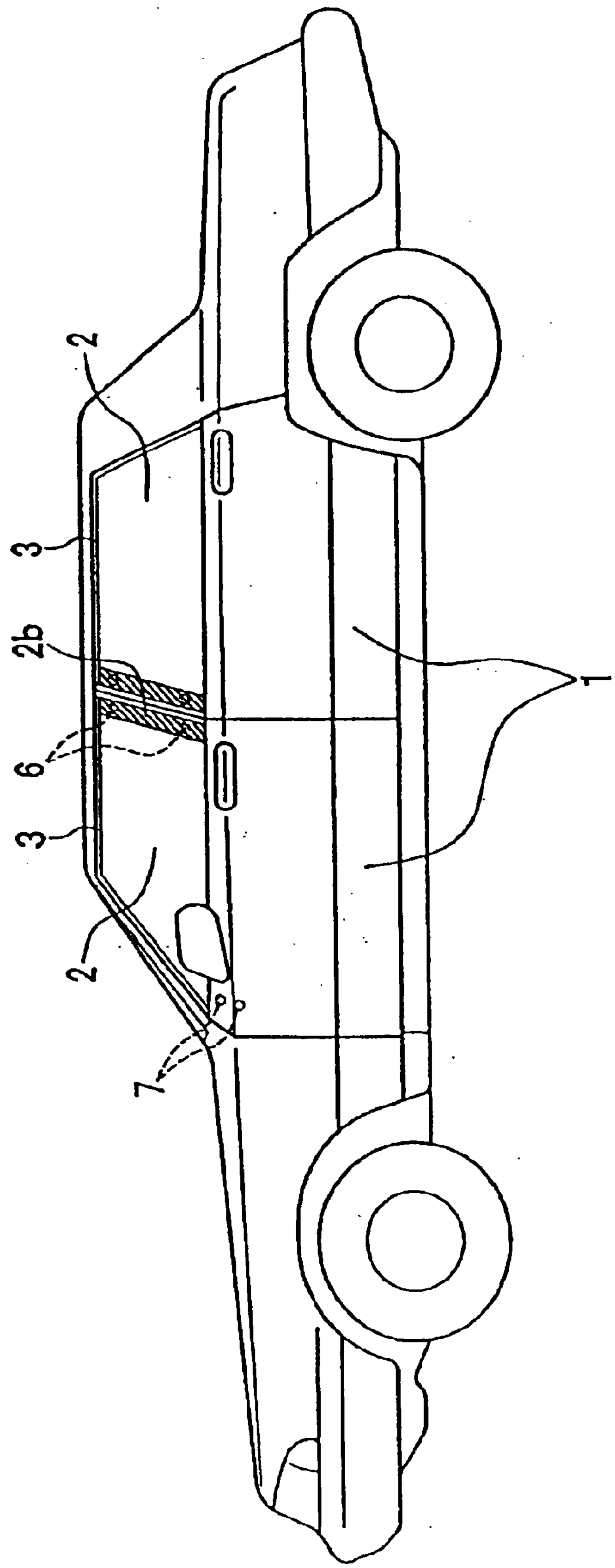
FIG. 1 is an explanatory side view of a vehicle wherein window runners, which are one of components of a supporting structure of a window glass, are indicated.

FIG. 1 is an explanatory side view of a vehicle wherein window runners, which are one of components of a supporting structure of a window glass, are indicated.

Figure 2:
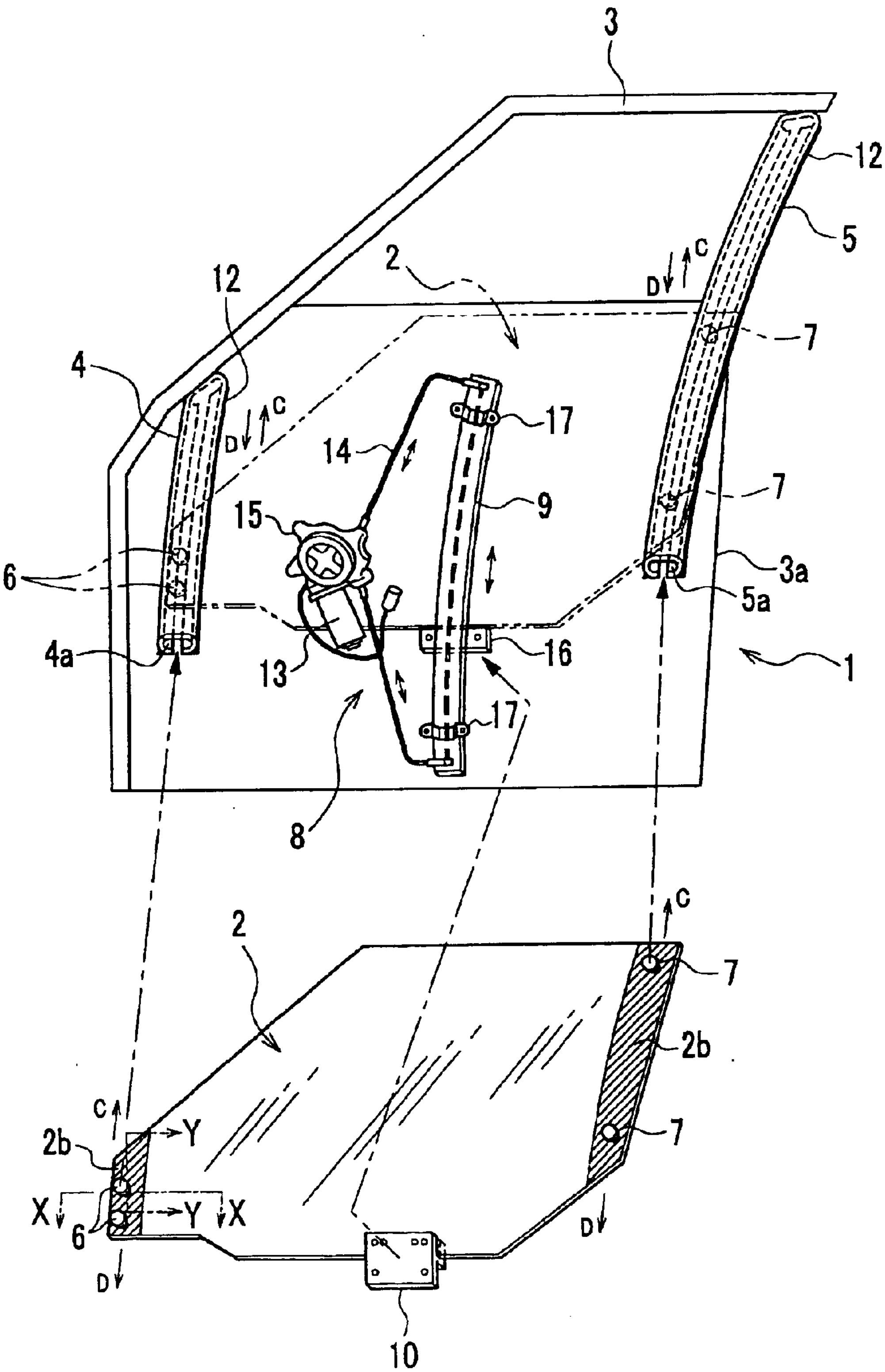
FIG. 2 is an exploded perspective view looking at substantial components of a door from a vehicle cabin side, wherein an inner panel is omitted.

FIG. 2 is an exploded perspective view looking at substantial components of a door from a vehicle's cabin side, wherein an inner panel is omitted.

Figure 3:
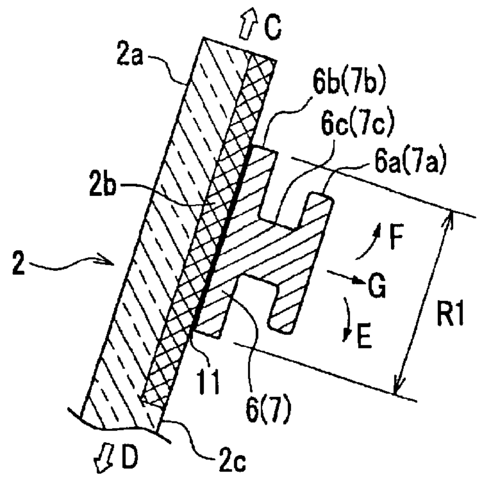
FIG. 3 is an enlarged sectional view along a line of Y—Y in FIG. 2.
Figure 4:
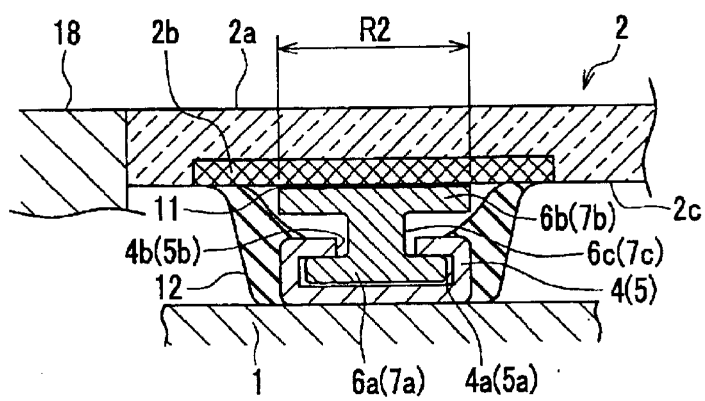
FIG. 4 is an enlarged sectional view along a line of X—X in FIG. 2.

FIG. 3 is an enlarged sectional view along a line of Y—Y in FIG. 2. FIG. 4 is an enlarged sectional view along a line of X—X in FIG. 2.

As shown in FIG. 2, the door 1 is mainly composed of an outer panel 3*a*, an inner panel (not shown) , and a door sash 3.

The outer panel 3*a* is placed at the outer side of the door components, and the inner panel is placed at the vehicle's cabin side of the door components. The space (an interior space) is provided between the outer panel 3*a* and the inner panel, and stores a regulator 8, guide rails 4 and 5, and a beam (not shown) which reinforces the rigidity of the door 1. Here, the regulator 8 is a device that controls the ups-and-downs (open and shut) movements of the window glass 2. Additionally, the interior space between the outer panel 3*a* and the inner panel is used for storing the window glass 2 when the window glass is lowered (opened) . In this FIG. 2, the inner panel is omitted so that the arrangements of the regulator 8 and guide rails 4 and 5, which are provided within the interior space, can be realized.

As shown in FIG. 1, the door 1 has a door sash 3 which prevents a window glass 2 from falling away from the door 1. This falling away of the window glass 2 from the door 1 occurs when the negative pressure resulting from the flow of the wind during a travel of a vehicle is caused. The door sash 3 is provided on the inner panel and the outer panel 3*a* so as to support the edge of the window glass 2.

A laminated glass having an intermediate layer, such as a colored film, between window pieces and a tempered glass are used as the window glass 2.

As shown in FIG. 4, the outside surface 2*a* of the window glass 2 is flush with an outside surface of a vehicle body 18. Here, the outside surface of the vehicle body 18 means that the surface of the vehicle body 18 in the case of a hard-top vehicle. The outside surface of the vehicle body 18 means that the surface of the door 1 in the case of a vehicle other than a hard-top vehicle.

As shown in FIG. 2 through FIG. 4, the window glass 2 has window runners 6 in the vicinity of the fore-side end of the window glass 2, and has window runners 7 in the vicinity of the rear-side end of the window glass. Each of the window runners 6 and 7 is a bobbin like-shaped member and is fixed to the window glass 2 by a bonding agent 11.

As can be seen in FIG. 2, the window runners 6 are lined up along the moving direction (ups-and-downs directions) of the window glass 2, and the window runners 7 are lined up along the moving direction (ups-and-downs directions) of the window glass 2.

To be more precise, each of the window runners 6 and 7 is an H-like shaped member in sectional viewing. Hereinafter, the explanation about the window runner 6 and the window runner 7 will be carried out simultaneously.

As shown in FIG. 3, the window runner 6 (7) is composed of an engagement part 6*a* (7*a*) , a junction 6*b* (7*b*) , and a shaft part 6*c* (7*c*).

The engagement part 6*a* (7*a*) fits into a hollow part 4*a* (5*a*) of the guide rail 4 (5) so that the window runner 6 (7) is allowed to slide along the guide rail 4 (5) (see FIG. 4). The junction 6*b* (7*b*) is bonded to an inner surface 2*c* (vehicle's cabin side surface) of the window glass 2 by the bonding agent 11. The shaft part 6*c* (7*c*) is provided between the engagement part 6*a* (7*a*) and the junction 6*b* (7*b*) , and positions in a groove 4*b* (5*b*) of the guide rail 4 (5).

As shown in FIG. 3, the sharp edge of the engagement part 6*a* (7*a*) is removed for reducing a frictional resistance between the engagement part 6*a* (7*a*) and the hollow part 4*a* (5*a*) of the guide rail 4 (5).

In the present invention, the ups-and-downs direction's length (R1) of the junction 6*b* (7*b*) is longer than the fore-and-rear direction's length (R2) of the junction 6*b* (7*b*). In other words, the length (R1) along the sliding (transfer) directions of the window glass 2 of the junction 6*b* (7*b*) is longer than the length (R2) perpendicular to the sliding (transfer) direction of the window glass 2 of the junction 6*b* (7*b*).

This is because the with the junction configured in this way, and adhesively fixed to the window glass 2 by the bonding agent 11, the junction's adhesive strength against a shearing force, which is applied in the ups-and-downs direction when the window glass 2 is moved in the ups-and-downs direction, becomes stronger. It should be note that the upward direction of raising the window glass 2 is indicated by the arrow C in FIGS. 2 and 3, wile the downward direction of lowering the window glass 2 is indicated by the arrow D therein.

In the present invention, to be more precise, since the area in the ups-and-downs directions of the junction 6*b* (7*b*) is large, the adhesive force between the junction 6*b* (7*b*) and the window glass 2 exceeds the momentum force, which is applied in the ups-and-downs direction (shown by arrows E and F) , and the tensile force, which is applied in the direction shown by an arrow G. Thus, the window runner 6 (7) is not detached from the window glass 2 when the window glass 2 is moved in the ups-and-downs directions and excess momentum force is applied to the junction 6*b* (7*b*).

As can be seen from FIG. 4, the shaft part 6*c* (7*c*) of the window runner 6 (7) is placed in the groove 4*b* (5*b*) , and the shaft part 6*c* (7*c*) is moved in the ups-and-downs directions along the groove 4*b* (5*b*), when the window glass 2 is moved in order to open or shut the window.

As shown in FIG. 2 and FIG. 4, the window glass 2 has a blind part 2*b* so that each of the window runners 6 and 7 being provided on the window glass 2 is hidden by the blind part 2*b*. In the present embodiment, therefore, each of the window runners 6 and 7 are invisible from an outside of the vehicle. Here, since the window glass has the window runners 6 at the fore-side thereof and the window runners 7 at the rear-side thereof, a total of two blind parts 2*b* are provided on the window glass 2.

The blind part 2*b* is obtained by applying a ceramic processing on the transparent window glass, or by laminating an opaque colored film, such as a black film on the window glass 2. Here, if a laminated glass is adopted as a window glass 2, this blind part 2*b* may be obtained by providing a colored film between window pieces of the laminated glass.

A connector 10, which is connected to a carrier plate 16 of the regulator 8 that controls the ups-and-downs movement of the window glass 2, is fixed to the bottom in the middle part of the window glass 2 by a bolt (not shown).

The guide rails 4 and 5 are engaged with the window runners 6 and 7, respectively, and allow the window glass 2 to move along the guide rails 4 and 5. Hereinafter, the explanation about the guide rail 4 and the guide rail 5 will be carried out simultaneously.

The guide rail 4 (5) is a C-shaped long member in sectional viewing, and has a hollow part 4*a* (5*a*) to be fitted with the engagement part 6*a* (7*a*) of the window runner 6 (7), and a groove 4*b* (5*b*) for holding the shaft part 6*c* (7*c*) of the window runner 6 (7).

In the present invention, the guide rail 4 (5) is arranged so that the longitudinal direction of the guide rail 4 (5) is placed along the ups-and-downs directions of the door 1 in the condition that the groove 4*b* (5*b*) of the guide rail 4 (5) faces the window glass 2.

As shown in FIG. 2, the guide rail 4 is disposed in the vicinity of the fore-side end of the door 1 and the guide rail 5 is disposed in the vicinity of the rear-side end of the door 1. The guide rail 4 (5) is fixed to the door sash 3 and the door 1 by welding for allowing the window glass 2 to move in the ups-and-downs directions smoothly and for supporting the window glass 2 with accuracy. In the present embodiment, at least top and bottom parts of these guide rails 4 and 5 are fixed to the door 1 by welding.

The guide rail 4 supports the fore-side of the window glass 2, so that the slide of the window runner 6 along the groove 4*b* is allowed, when the window glass 2 is moved in the ups-and-downs directions. The upper end of the guide rail 4 is fixed to the door sash 3 by welding, and the lower end of the guide rail 4 is fixed to the inner panel or a beam (not shown) disposed in the interior space of the door 1.

The regulator 8 drives a motor 13 and controls the turn of a drum 15. Thereby, since a wire 14 is being wound around the drum 15, the motion of the wire 14 in the direction shown by arrow is allowed.

The cross-sectional shape of the guide rail 4 is the same shape as that of the guide rail 5. These guide rails 4 and 5 are made of same metallic materials In the present embodiment, the longitudinal length of the guide rails 4 and 5 are determined based on the shape of the window glass 2 and the shape of the door sash 3. Thus, the longitudinal length of the guide rail 4 differs from that of the guide rail 5.

As shown in FIG. 4, each of the guide rails 4 and 5 is provided with sealing material 12. This sealing material 12 comes in contact with the inner surface 2*c* of the window glass 2, and prevent the intrusion of the foreign materials, such as dust, into the guide rail 4 (5). Thereby, the occurrence of the disturbance of the slide of the window runner 6 (7) due to the dust in the guide rail 4 (5) can be prevented.

The regulator 8 drives a motor 13 and controls the turn of a dram 15. Thereby, since a wire 14 is being wound around the dram 15, the motion of the wire 14 in the direction shown by arrow is allowed.

As shown in FIG. 2, the wire 14 is passed through the holes provided at both ends in the longitudinal directions of a guide plate 9, and connects with a carrier plate 16 positioned on the outer panel side with respect to the guide plate 9. Here, since the carrier plate 16 is screwed to the connector 10 of the window glass 2, the regulator 8 can control the ups-and-downs movements of the window glass 2 by moving the carrier plate 16, which is connected to the wire 14.

In the present invention, therefore, the guide plate 9 is provided at the middle in the width directions (fore-and-rear directions) of the door 1, so that the guide plate 9 is placed along the longitudinal directions of the guide rails 4 and 5. In other words, the guide plate 9 is provided so that the guide plate 9 is in parallel with the guide rails 4 and 5.

In the present embodiment, the guide plate 9 is fixed to the door 1 (the inner panel or the beam) through a bracket 17 using a screw. In the present embodiment, a regulator adopting a wire-drum is used as the regulator 8.

As shown in FIG. 2 and FIG. 3, the window runners 6 are lined up along the ups-and-downs directions (transfer directions) of the window glass 2 and the window runners 7 are lined up along the ups-and-downs directions (transfer directions) of the window glass 2. Thus, each of the window runners 6 (7) fits into the guide rail 4 (5) , respectively, when the window glass 2 is installed on a vehicle.

Next, the act of the supporting structure of a window glass of the vehicle according to the present embodiment will be explained.

When a switch (not shown) of an automatic window apparatus is operated so as to move the window glass 2 in the lower direction, the drum 15 is turned by the motor 13. In this occasion, the wire 14 is moved in the direction that allows the carrier plate 16 to move downwardly. Thus, the window glass 2 connected to the wire 14 through the carrier plate 16 is moved downwardly along the guide rails 4 and 5. In this occasion, since the engagement part 6*a* (7*a*) of the window runner 6 (7) slide along the hollow part 4*a* (5*a*) of the guide rail 4 (5), the window glass 2 is smoothly moved in the lower direction.

In the present embodiment, on the other hand, when the switch (not shown) of the automatic window apparatus is operated so as to move the window glass 2 in the upper direction, the drum 15 is turned by the motor 13. In this occasion, the wire 14 is moved in the direction that allows the carrier plate 16 (window glass 2) to move upwardly. Thus, the window glass 2, connected to the wire 14 through the carrier plate 16 is moved upwardly along the guide rails 4 and 5.

In the present embodiment, as described above, since nothing is protruding from the outside surface of the window glass 2, the outside surface of the window glass is flush with the outside surface of the vehicle. Thus, the wind-roar due to the protrusion is never caused.

In the present invention, additionally, the window runners 6 and 7 are provided within the vehicle cabin and are not exposed to a wind and rain. Thus, the considerable endurance of the window runner 6 and 7 can be obtained. In this case, since the bonding agent, which is suitable for use in the vehicle cabin's environment, can be adoptable, the bonding strength of the window runner 6 and 7 can be improved.

In the present embodiment, furthermore, since the window runners 6 and 7 are hidden by the blind part 2*b*, the appearance and the luxury texture of the vehicle are not defaced.

In the present embodiment, still further more, since the supporting structure of the present invention is composed of a small numbers of the parts and is small in size, the adoption of the supporting structure does not require the excess cost. Thus, various types of vehicles can adopt the present invention's guide rail by simply changing the longitudinal length of the guide rail in compliance with the size of the window glass.

Second Embodiment

Next, the supporting structure of a window glass according to the second embodiment of the present invention will be explained.

Figure 5:
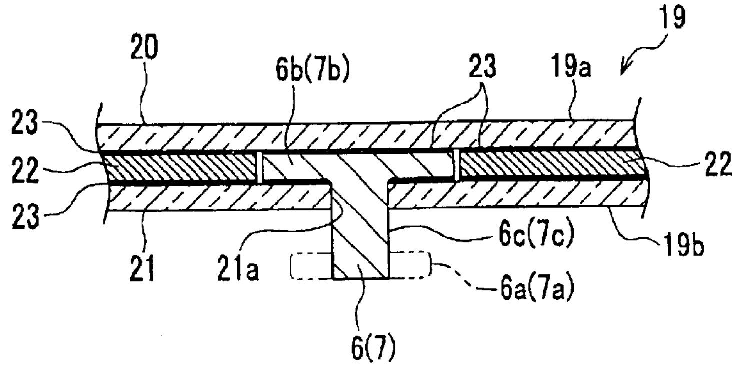
FIG. 5 is an explanatory view showing substantial components of a supporting structure of the window glass for a vehicle according to the second embodiment.
Figure 6:
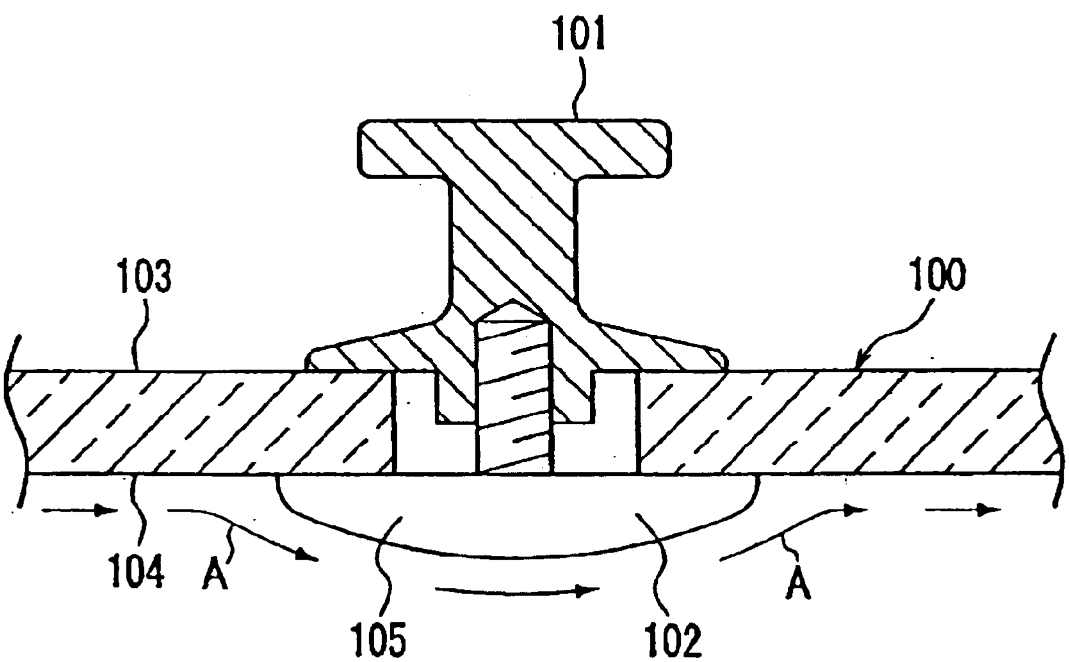
FIG. 6 is an enlarged view showing the condition that the joint is fixed to the window glass by a screw.

FIG. 5 is an explanatory view showing substantial components of a supporting structure of the window glass for a vehicle according to the present second embodiment.

In the present second embodiment, the laminated glass 19 composed of a first window piece 20 and a second window piece 21 is adopted instead of the window glass of the first embodiment. In this laminated glass 19, the junction *6b* (*7b*) of the window runner 6 (7) is sandwiched between the first window piece 20 and the second window piece 21. Thereby, the window runner 6 (7) is firmly held by the laminated glass 19.

In this laminated glass 19, the first window piece 20 is positioned at the outer side of the vehicle, and the second window piece 21 is positioned at the vehicle's cabin side. Intermediate layers 22 made of synthetic resin material, such as an acrylic resin, are disposed between the first window piece 20 and the second window piece 21. In this laminated glass 19, the first window piece 20, the second window piece 21, and intermediate layers 22 are bonded by a bonding agent 23.

The window runner 6 (7) of the second embodiment is a bobbin like-shaped member and is made of thermosetting resin.

The junction *6b* (*7b*) of the window runner 6 (7) is placed between the first window piece 20 and the second window piece 21. As can be seen from FIG. 5, an inner surface of the junction *6b* (*7b*) of the window runner 6 (7) is bonded to the second window piece 21 and an outside surface of the junction *6b* (*7b*) of the window runner 6 (7) is bonded to the first window piece 20.

Here, since the junction *6b* (*7b*) is firmly held between the first window piece 20 and the second window piece 21, the position of the window runner 6 (7) is not moved in the vertical directions with respect to the surface of the laminated glass 19. In other words, since the junction *6b* (*7b*) is sandwiched between the first window piece 20 and the second window piece 21, the window runner 6 (7) is stably provided on the laminated glass 19. Thus, the window runner 6 (7) never cause a rattle sound when the window runner 6 (7) moves along the guide rail 4 (5).

The shaft part *6c* (*7c*) goes through a through-hole *21a* provided on the second window piece 21 and protrudes toward the vehicle's cabin side, when forming the laminated glass 19 from the first window piece 20 and the second window piece 21. Then, the tip of the shaft part *6c* (*7c*) is treated with a heat treatment in order to form an engagement part *6a* (*7a*).

In the practice of the present invention, as described above, the outside surface *19a* of the laminated glass 19 is substantially flush with the external surface of the vehicle. In addition, the window runner 6 (7) extends (inwardly) away from the smooth surface of the window glass only on the cabin side *19b* of the laminated glass 19. Thus, the wind-roar is never caused.

In the present invention, the window runner 6 (7) is not exposed to a wind and rain. Thus, the window runner 6 (7) with considerable endurance can be obtained.

In the present embodiment, the junction *6b* (*7b*) of the window runner 6 (7) is sandwiched between the first window piece 20 and the second window piece 21 and is bonded to each of the first window piece 20 and the second window piece 21. Thus, the window runner 6 (7) is firmly fixed to the laminated glass 19 with sufficient bonding strength. Thereby, the occurrence of the crack of the laminated glass 19 can be prevented even if a stress caused by the slide of the laminated glass 19 is concentrated on the region around the junction *6b* (*7b*) of the laminated glass 19.

Although there have been disclosed what are the present embodiments of the invention, it will be understood by person skilled in the art that variations and modifications may be made thereto without departing from the scope of the invention, which is indicated by the appended claims.

In the above described embodiment, the supporting structure that is used for a window glass of a front door of a vehicle has been explained as an example. But the supporting structure of the present invention can be adoptable as long as the supporting structure is used for supporting the window glass, which is used in order to open or shut the window by sliding the window glass. For example, the supporting structure of the present invention may be adoptable for a window glass of a rear door or a sunroof.

In the above described embodiment, additionally, the window glass, which is stored within the door component when the window is opened, has been explained as an example of the window glass. But, the window glass, which is stored within the vehicle body when the window is opened, can be adoptable.

In the above described embodiment, the supporting structure, which is used for a window glass of a door equipped with a door sash, has been explained. But the supporting structure of the present invention may be adoptable for a window glass of a hard-top door, which has no door sash. In this case, the sliding of the window glass is allowed by providing the guide rails within a door or to the vehicle body.

In the above described embodiment, the window runner is made of resin material. But the oleo-resin material can be adoptable instead of resin material. In this case, since the frictional resistance between the engagement part and the hollow part of the guide rails can be reduced, the smooth slide of the window runner along the guide rail can be brought out.

In the present embodiment, the window runner may be fixed to the window glass by utilizing various types of adhesion techniques, such as heat or ultrasonic welding technique.

In the present invention, a laminated glass may include a colored film layer between the first window piece and the intermediate layer in order to hide the window runner when the window glass is provided on the door of a vehicle. As an example of this colored film layer, a film made of poly vinyl butyral, which is a sturdy and flexible material, can be adoptable. In this case, the misalignment and the scattering of the window glass can be prevented even if the accidental demolition of the window glass occurs.

What is claimed is:

1. In a vehicle of the type comprising a door, and a window glass supported for slidable movement with respect to said door, the improvement comprising improved supporting structure of said window glass in said vehicle, the improved supporting structure comprising:

a window runner, which comprises:

a junction which is fixed to the window glass, and an engagement part, which is operatively connected to the junction and engaged with a guide rail provided at the vehicle's cabin side and is moved in the ups-and-downs direction of the window glass, wherein the junction has a cross-sectional width which is greater than a cross-sectional width of the engagement part, and wherein the window runner is adhesively bonded to the vehicle's cabin side surface of the window glass through the junction.

2. A supporting structure of a window glass of a vehicle according to claim 1, wherein a dimension in the ups-and-downs direction of the junction is larger than a dimension in the fore-and-rear direction of the junction.

3. In a vehicle of the type comprising a door, and a window glass supported for slidable movement with respect to said door, the improvement comprising improved supporting structure of said window glas in said vehicle, the improved supporting structure comprising:

a window runner, which comprises:

a junction which is fixed to the window glass, and an engagement part, which is operatively connected to the junction and engaged with a guide rail provided at the vehicle's cabin side and is moved in the ups-and-downs direction of the window glass.

wherein the window runner is adhesively bonded to the vehicle's cabin side surface of the window glass through the junction.

wherein the window glass is composed of a first window piece, which is placed in an external side of the vehicle, and a second window piece, which is placed in a vehicle's cabin side, and wherein the junction of the window runner is sandwiched between the first to the first window piece, and the other side surface of the junction is bonded to the second window piece.

4. A supporting structure of a window glass of a vehicle, the supporting structure comprising;

a guide rail, which is provided along a transfer direction of the window glass; and a plurality of spaced-apart window runners, which are fixed to the window glass from a vehicle cabin side with selected window runners lined up along the transfer direction of the window glass, and which operatively engage with the guide rail, wherein the window glass has an exterior surface, wherein the window runner are entirely disposed inboard of the exterior surface of the window glass, and wherein the window runner move along the guide rail, when the window glass is transferred.

5. A supporting structure of a window glass of a vehicle according to claim 4, wherein said plurality of spaced apart window runners include a first window runner which is placed on one side of the window glass, and a second window runner which is placed on other side of the window glass, and wherein the guide rail includes a first guide rail to be engaged with the first window runner, and a second guide rail to be engaged with the second window runner.

6. A supporting structure of a window glass of a vehicle according to claim 2, wherein said dimension is length.

7. A supporting structure of a window glass of a vehicle according to claim 3, wherein said first and second window pieces are laminated together.

8. A supporting structure of a window glass of a vehicle according to claim 4, wherein said window runner is adhesively bonded to a vehicle cabin side surface of said window glass.

9. A supporting structure of a window glass of a vehicle the supporting structure comprising:

a guide rail, which is provided along a transfer direction of the window glass; and a window runner, which is fixed to the window glass from a vehicle cabin side and which operatively engages with the guide rail, wherein the window glass has an exterior surface, whreein the window runner is entirely disposed inboard of the exterior surface of the window glass, and wherein the window runner moves along the guide rail, when the window glass is transferred, wherein said window glass includes first and second pieces laminated together, and a portion of said window runner is fixed between said first and second window pieces.

10. In a vehicle of the type comprising a door, and a window glass supported for slidable movement with respect to said door, the improvement comprising improved support structure for supporting said window glass in said vehicle, the improved support structure comprising:

a guide rail provided in said door and facing toward a cabin side of the vehicle, for guidingly receiving a portion of a window runner therein;

at least one window runner adhesively affixed to the window glass on the cabin side of the vehicle and which operatively engages with the guide rail, wherein said window runner comprises:

a junction which is adhesively affixed to the window glass, an engagement part; and a connector portion which extends between and operatively interconnects the junction and the engagement part, wherein the junction has a cross-sectional width which is greater than a cross-sectional width of the engagement part, and wherein said engagement part engages with the guide rail, and is movable in the ups-and-downs direction of the window glass.

11. The improved support structure of claim 10, wherein the support structure comprises a plurality of window runners adhesively affixed to the window glass proximate opposed side edges thereof on the cabin side of the vehicle, wherein said window runners are arranged in two spaced apart substantially linear arrays.

12. The improved support structure of claim 10, wherein said connector portion is a shaft having a smaller diameter than that of the junction, and wherein said junction and said engagement part are each substantially disc-shaped.

13. In a vehicle of the type comprising a door, and a window glass supported for slidable movement with respect to said door, the improvement comprising improved support structure for supporting said window glass in said vehicle, the improved support structure comprising:

guide rail provided in said door and facing toward a cabin side of the vehicle, for guidingly receiving a portion of a window runner therein:

at least one window runner adhesively affixed to the window glass on the cabin side of the vehicle and which operatively engages with the guide rail, wherein said window runner comprises:

a junction which is adhesively affixed to the window glass, an engagement part: and a connector portion which extends between and operatively interconnects the junction and the engagement part, wherein said engagement part engages with the guide rail, and is movable in the ups-and-downs direction of the window glass, and wherein the window glass comprises a first window piece, which is placed in an external side of the vehicle, and a second window piece, which is placed in a vehicle's cabin side, wherein the junction of the window runner is sandwiched between the first window piece and the second window piece, and one side surface of the junction is bonded to the first window piece, and the other side surface of the junction is bonded to the second window piece.

14. The improved support structure of claim 10, wherein a dimension in the ups-and-downs direction of the junction is larger than a dimension in the fore-and-rear direction of the junction.

15. The improved support structure of claim 10, wherein the window glass has an exterior surface which is substantially flush with a body of the vehicle, and wherein the window runner is entirely disposed inboard of the exterior surface of the window glass.

16. The supporting structure of a window glass of a vehicle according to claim 1, wherein the engagement part is substantially disk-shaped.

17. The supporting structure of a window glass of a vehicle according to claim 10, wherein the engagement part is substantially disk-shaped.

* * * * *